(No Model.)  2 Sheets—Sheet 1.

C. ZIMMERMANN.
HOT WATER URN.

No. 413,471.  Patented Oct. 22, 1889.

WITNESSES:

INVENTOR
Charles Zimmermann
BY
ATTORNEYS.

(No Model.) 2 Sheets—Sheet 2.
C. ZIMMERMANN.
HOT WATER URN.
No. 413,471. Patented Oct. 22, 1889.
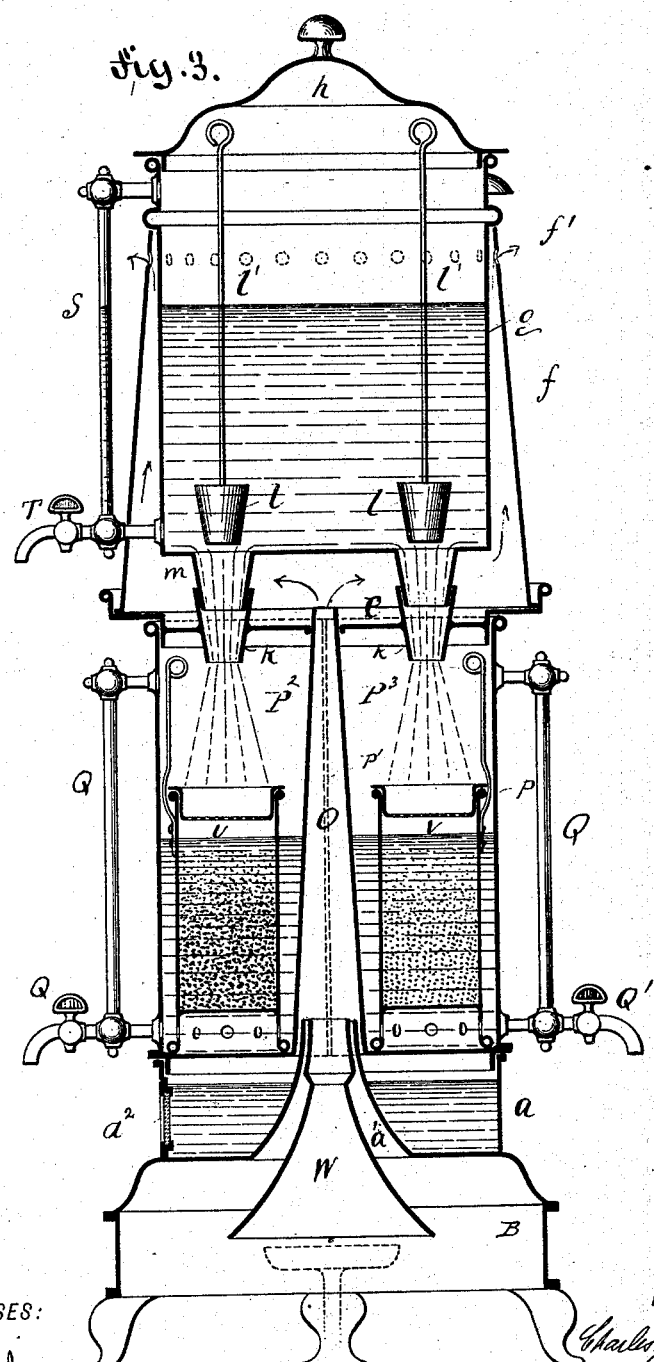
WITNESSES:
INVENTOR
Charles Zimmermann
BY
ATTORNEYS.

UNITED STATES PATENT OFFICE.

CHARLES ZIMMERMANN, OF NEW YORK, N. Y.

HOT-WATER URN.

SPECIFICATION forming part of Letters Patent No. 413,471, dated October 22, 1889.

Application filed November 1, 1888. Serial No. 289,723. (No model.)

*To all whom it may concern:*

Be it known that I, CHARLES ZIMMERMANN, of the city of New York, in the county of New York and State of New York, have invented certain new and useful Improvements in Hot-Water Urns, of which the following is a specification.

This invention relates to improvements in that class of devices used for heating water in restaurants, saloons, &c., and in which the sources of heat are usually a gas or kerosene flame; and the object of my invention is to provide a new and improved hot-water urn in which there is very little loss of heat, and the water before being admitted into the urn proper receives a preliminary heating.

The invention consists in the combination, with a vessel having an inverted-funnel-shaped bottom and a pipe extending upward from said bottom, of an additional vessel supported above the first-mentioned vessel and a valved tube establishing communication between the two vessels.

Figure 1:
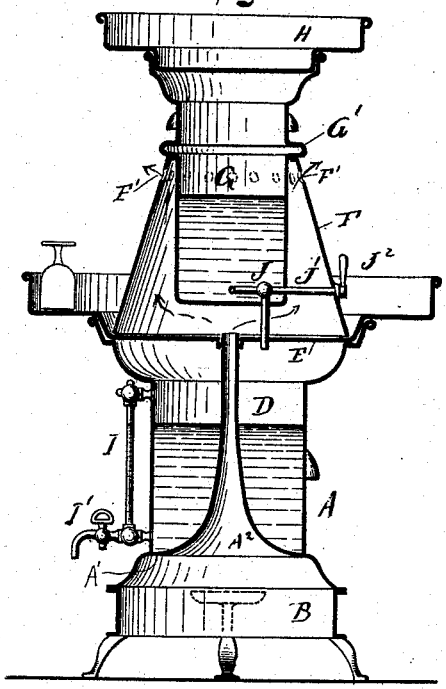
Figure 2:
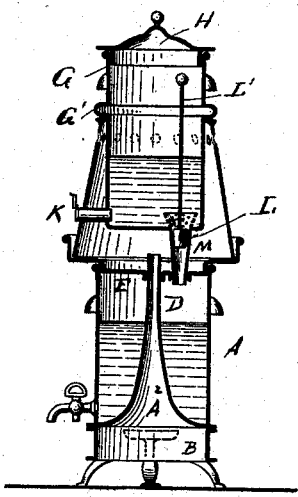

In the accompanying drawings, Figure 1 is a vertical transverse sectional view of my improved hot-water urn. Fig. 2 is a vertical transverse sectional view of a modification. Fig. 3 is a vertical transverse sectional view of my improved hot-water urn adapted as a tea and coffee urn.

Similar letters of reference indicate corresponding parts.

The cylindrical vessel A is secured on a hollow base B for receiving the burner. (Shown in dotted lines.) The bottom A' of the vessel A is made inverted-funnel-shaped and tapering, and terminates in a tube D, that projects above the top of the vessel A and through an aperture in a plate E, placed on the top of the cylinder A. On the plate E an inverted-funnel-shaped shell F is placed, within which a cylindrical vessel G is supported, which is closed at the bottom and open at the top, said vessel G having an exterior annular bead G' resting on the edge of the smaller top opening of the shell F. A cover H is placed on the top of the cylindrical vessel G, and may be enlarged, as shown in Fig. 1, so as to permit placing tumblers and goblets on the same to keep them warm. The plate E may also be provided with an extension for the same purpose. The vessel G is provided with a cock J, projecting through the bottom of said vessel G and through the plate E. The handle-rod J' of said cock projects from the vessel G through the shell F, and is provided at its outer end with a handle $J^2$. The shell F has a series of apertures F' in its upper end. The cylindrical vessel A is provided with a gage-glass I and the cock I', for drawing off the hot water. The heat from the burner passes up through the funnel-shaped bottom $A^2$ of the cylindrical vessel A and through the tube D and heats the walls of said funnel and the tube D, whereby the water in the urn or cylindrical vessel A is heated. The products of combustion pass from the upper end of the tube D, strike against the bottom of the cylindrical vessel G, and circulate around said vessel within the jacket F, and pass out through the apertures F', thereby warming the water in the vessel G.

Whenever the water in the lower vessel A is to be replenished, the cock J is opened, so as to permit the warm water to flow from the upper vessel G into the lower cylindrical vessel A. A fresh supply of cold water is then poured into the upper vessel G and is warmed in the course of time in the manner described.

In the construction shown in Fig. 2 the upper vessel G is provided with an eye-piece K to ascertain whether there is any water in the same or not. The upper vessel G is provided with a tapering spout in its bottom M, which spout passes through an opening in the top plate E. A plug or stopper L serves for closing the spout M, and is secured on the lower end of a rod L', extending to the top of the vessel G.

In the construction shown in Fig. 3 the cylinder A is provided with a gage-glass $a^2$. The upper end of the funnel-shaped bottom a' of the cylinder a projects into the lower end of a tapered tube O, open at the top and bottom and secured in the center of a cylindrical vessel P, closed at the bottom and open at the top and divided by a transverse partition P' (shown in dotted lines) into two compartments $P^2$ $P^3$, each provided with a gage-glass Q and a cock Q' at the bottom. The top plate e is placed on the cylindrical vessel P, and is provided with two tapered spouts R. A shell $f$ rests on the plate $e$, and in the same the cylindrical vessel $g$ is supported, which is provided with a cover $h$ and a gage-glass S and a cock T. From the bottom of the vessel G two tapering spouts or nozzles $m$ project into the tapering spouts R on the plate $e$, and said nozzles $m$ can be closed by stoppers $l$, secured to rods $l'$, extending into the top of the cylinder $g$.

A straining-vessel U, adapted to receive coffee or tea, is placed into the compartment P² of the cylinder P, and a like vessel V is placed into the compartment P³. An inverted-funnel-shaped deflector W' is placed into the recess in the bottom of the cylindrical vessel $a$. The heat from the flame passes up through the central aperture of the deflector W, through the tapering tube O in the vessel P, strikes against the bottom of the upper cylindrical vessel $g$, and circulates around said vessel within the jacket $f$, and passes out through the apertures $f'$ in the top of said jacket $f$.

To make tea or coffee the plug $l$ is raised to permit the hot water to flow from the vessel $g$, through the spouts $m$ and R, upon the tea and coffee contained in the vessel U or V. When desired, tea or coffee can be drawn from the corresponding compartments P² or P³ by means of the cocks Q'. The liquid tea or coffee is also heated by coming in contact with the heated walls of the tapering tube O. Between the funnel-shaped bottom of the cylindrical vessel $a'$ and the upper surface of the funnel-shaped deflector W a quantity of air is drawn upward and heated with the products of combustion passing up through the tapering tube O.

The sides of the strainers U and V may be perforated.

Having thus described my invention, I claim as new and desire to secure by Letters Patent—

1. In a hot-water urn, the combination, with a cylindrical vessel having an inverted-funnel-shaped bottom, of a tube extending upward from said bottom through the top of said vessel and serving as a flue for the products of combustion from a burner below said funnel-shaped bottom, an additional vessel supported above the upper end of the flue that extends upward from the inverted-funnel-shaped bottom of the lower vessel, whereby the products of combustion leaving the top of the flue strike against the bottom of the upper vessel and heat the water in said upper vessel, said upper and lower vessels being connected, substantially as set forth.

2. In a hot-water urn, the combination, with a vessel having an inverted-funnel-shaped bottom, a tube extending upward and through the top of said vessel and forming a flue for the products of combustion from a burner below the inverted-funnel-shaped bottom, an apertured plate on said vessel, through the aperture of which plate the above-mentioned tube or flue passes, a tapering jacket resting on said plate, a vessel supported within said jacket and above the upper end of the tube or flue, and a valved pipe establishing communication between the upper and lower vessels, substantially as set forth.

3. In a hot-water urn, the combination, with a vessel having an inverted-funnel-shaped bottom, of a tube extending upward from said funnel-shaped bottom through the top of said vessel and forming a flue for the products of combustion from a burner below the inverted-funnel-shaped bottom, an additional vessel supported above the first-mentioned vessel and having its bottom above the upper end of said flue, whereby the products of combustion passing from the upper end of the flue strike the bottom of said vessel and heat the contents of said vessel, and a valved tube establishing communication with the two vessels, substantially as set forth.

In testimony that I claim the foregoing as my invention I have signed my name in presence of two subscribing witnesses.

CHARLES ZIMMERMANN.

Witnesses:
OSCAR F. GÜNZ,
CARL KARP.